United States Patent [19]

Tinholt

[11] Patent Number: 4,971,115

[45] Date of Patent: Nov. 20, 1990

[54] FOUR-WAY POPPET VALVE WITH HOLLOW STEM AND FOUR-PORT BODY

[75] Inventor: Thomas Tinholt, Galesburg, Mich.

[73] Assignee: Humphrey Products Company, Kalamazoo, Mich.

[21] Appl. No.: 386,873

[22] Filed: Jul. 27, 1989

[51] Int. Cl.[5] .................... F15B 13/044; F16K 11/044

[52] U.S. Cl. ........................... 137/625.65; 137/625.27; 137/625.5

[58] Field of Search ............ 137/625.27, 625.5, 625.65

[56] References Cited

U.S. PATENT DOCUMENTS

| | | | |
|---|---|---|---|
| 3,538,954 | 11/1970 | Fagerlie et al. . | |
| 3,902,526 | 9/1975 | Brake et al. | 137/625.5 X |
| 4,026,325 | 5/1977 | Loveless . | |
| 4,066,101 | 1/1978 | De Fries | 137/625.6 |
| 4,074,700 | 2/1978 | Engle . | |
| 4,100,519 | 7/1978 | Neff . | |
| 4,103,711 | 8/1978 | Arvin . | |
| 4,267,862 | 5/1981 | Neff et al. . | |
| 4,301,715 | 11/1981 | Acar . | |
| 4,442,998 | 4/1984 | Ohyama et al. . | |
| 4,485,846 | 12/1984 | Neff . | |
| 4,494,572 | 1/1985 | Loveless . | |
| 4,566,490 | 1/1986 | Neff . | |
| 4,574,844 | 3/1986 | Neff et al. . | |
| 4,823,842 | 4/1989 | Toliusis . | |
| 4,842,020 | 6/1989 | Tinholt . | |

OTHER PUBLICATIONS

Skinner K4M valve brochure (9 pages), 1986.
Mac 35 Series publication, Mac Valves, Inc. 1986, 5 pages.
Mac 100 Series publication, Mac Valves, Inc. 1983, 4 pages.
Mac 200 Series publication, Mac Valves, Inc. 1983, 4 pages.
Mac 45 Series, Mac Valves, Inc. 1986, 5 pages.
Mac 900 Series, Mac Valves, Inc. 1983, 2 pages.
Humphrey Products Drawings Nos. N3201, N3201B and N1123A, 3 sheets, 1983.

*Primary Examiner*—Gerald A. Michalsky
*Attorney, Agent, or Firm*—Flynn, Thiel, Boutell and Tanis

[57] ABSTRACT

A valve assembly having a single stem slidably supported within a bore formed in a one-piece valve body provided solely with four ports. The stem is hollow to permit the exhaust from two load ports to be directed into a single exhaust port. This single exhaust port can desirably be provided with a pair of flow controls to permit individualized control of the exhaust from each load port. The valve poppets are preferably axially press fit unto the valve stem, particularly on portions of the valve stem which are of slightly different diameters, to permit the individual poppets to be precisely axially positioned relative to one another and relative to the valve seats to achieve high tolerance and precision of operation.

21 Claims, 4 Drawing Sheets

FOUR-WAY POPPET VALVE WITH HOLLOW STEM AND FOUR-PORT BODY

FIELD OF THE INVENTION

This invention relates to an improved poppet-type, single-stem, miniaturized four-way valve assembly which is particularly desirable for direct actuation by an electric solenoid.

BACKGROUND OF THE INVENTION

Numerous four-way valve assemblies have been developed for controlling liquids and gases, and such assemblies incorporate a wide range of structural and functional features. Such four-way valve assemblies have, for many years, been of substantial size and have often incorporated multiple shiftable valve stems in order to provide for proper control over fluid flow. Modern technology, however, has increasingly demanded that such valve assemblies be made of extremely small size, particularly for use in control circuits. Such assemblies must also permit shifting of the valve with extremely small force without detracting from the desired response time and/or flow.

One of the common problems associated with many known four-way valves, particularly when they use shiftable valves of the poppet type, has been that such assembles often require at least two poppet-type shiftable valve stems in order to provide the desired structural and functional relationships. This increases the structural complexity of the valve assembly, including the size thereof, and also increases the number of seal and wear points.

A further problem associated with known assemblies, particularly those which of are extremely small size so as to be suitable for use in control systems, is the difficulty in maintaining proper tolerances, including axial dimensional relationships between multiple poppets on a single stem and the axial positional relationship of the poppets relative to axially spaced valve seats. The necessary precision of manufacture in order to achieve the necessary tolerances has often been compromised in view of the difficulties in achieving such manufacture, or in view of the impracticality of doing so at reasonable cost.

In an attempt to improve upon the construction of miniaturized four-way poppet valves, the Assignee's U.S. Pat. No. 4 823 842 and the Assignee's application Ser. No. 234,467, now U.S. Pat. No. 4,842,020, disclose single-stem poppet-type four-way valves intended for operation by single or double solenoids. While these latter valves have proven successful for their intended use applications, nevertheless they do not provide the performance characteristics of a high technology precision valve created using conventional manufacturing methods.

Other attempts to provide a precision and miniaturized four-way poppet valve include a valve which employs a housing having five ports including exhaust ports located adjacent opposite ends of the valve stem, and which has no sealed relationship between the valve stem and the adjacent end of the solenoid armature whereby exhaust flow and inlet flow during shifting can enter the coil armature area. This valve also does not permit, within the confines of a one-piece valve housing, isolated exhausts within a single exhaust port. This valve also employs a poppet construction having a radially extending support flange on the valve stem, which support flange on axially opposite sides is provided with separate elastomeric annular inserts which function as poppets for contacting opposed valve seats. This arrangement creates limitations, such as a limited amount of elastomeric material, which are believed to restrict optimum manufacturing and performance requirements of the valve.

Other known valves also possess structural and functional characteristics which are undesirable. For example, many of the known valves have a main valve body provided with five ports including separate widely-spaced exhaust ports for communication with opposite ends of the valve bore, and a separate and often large manifold body must be attached thereto in order to permit individual control over the separate exhausts. Other valves use as many as three poppets on a single stem, or use an undesirable number of seal rings between the stem and housing in order to control flow. All of these features degrade the precision and cost effectiveness associated with the manufacture and operation of such valves.

Accordingly, it is an object of the present invention to provide an improved miniaturized four-way valve employing a single stem having poppets thereon, which valve is direct solenoid actuated.

In the improved valve assembly of this invention, a stem is slidably supported within a bore formed in a one-piece valve body provided solely with four ports, and the stem is hollow to permit the exhaust from two load ports to be directed into an exhaust arrangement, preferably a single exhaust port, located solely at one axial end of the valve body. This exhaust arrangement can desirably be provided with a pair of flow controls to permit individualized control of the exhaust from each load port.

In the improved valve assembly, as aforesaid, the poppets are preferably axially press fit unto the valve stem, particularly on portions of the valve stem which are of slightly different diameters, to facilitate manufacture and assembly of the valve while permitting the individual poppets to be precisely axially positioned relative to one another and relative to the valve seats to achieve high tolerance and precision of operation.

In the improved valve assembly, as aforesaid, the number of sliding seal contacts, such as the number of elastomeric seal rings, is minimized to significantly minimize the breakaway force necessary to permit efficient shifting of the valve stem, and thereby minimize the power requirements of the solenoid while maximizing the responsiveness of the valve assembly.

The valve assembly, as aforesaid, also incorporates an improved poppet arrangement whereby a single elastomeric poppet ring is molded around a radially extending rigid support flange which is mounted on the valve stem, whereby the elastomeric poppet ring integrally defines poppet seal faces on opposite axial sides thereof, and the poppet ring possesses a significant quantity of elastomeric material, whereby the sealing performance of the poppet relative to the opposed valve seats is believed significantly improved.

Other objects and purposes of the present invention will be apparent to persons familiar with valve assemblies of this general type upon reading the following specification and inspecting the accompanying drawings.

Figure 1:
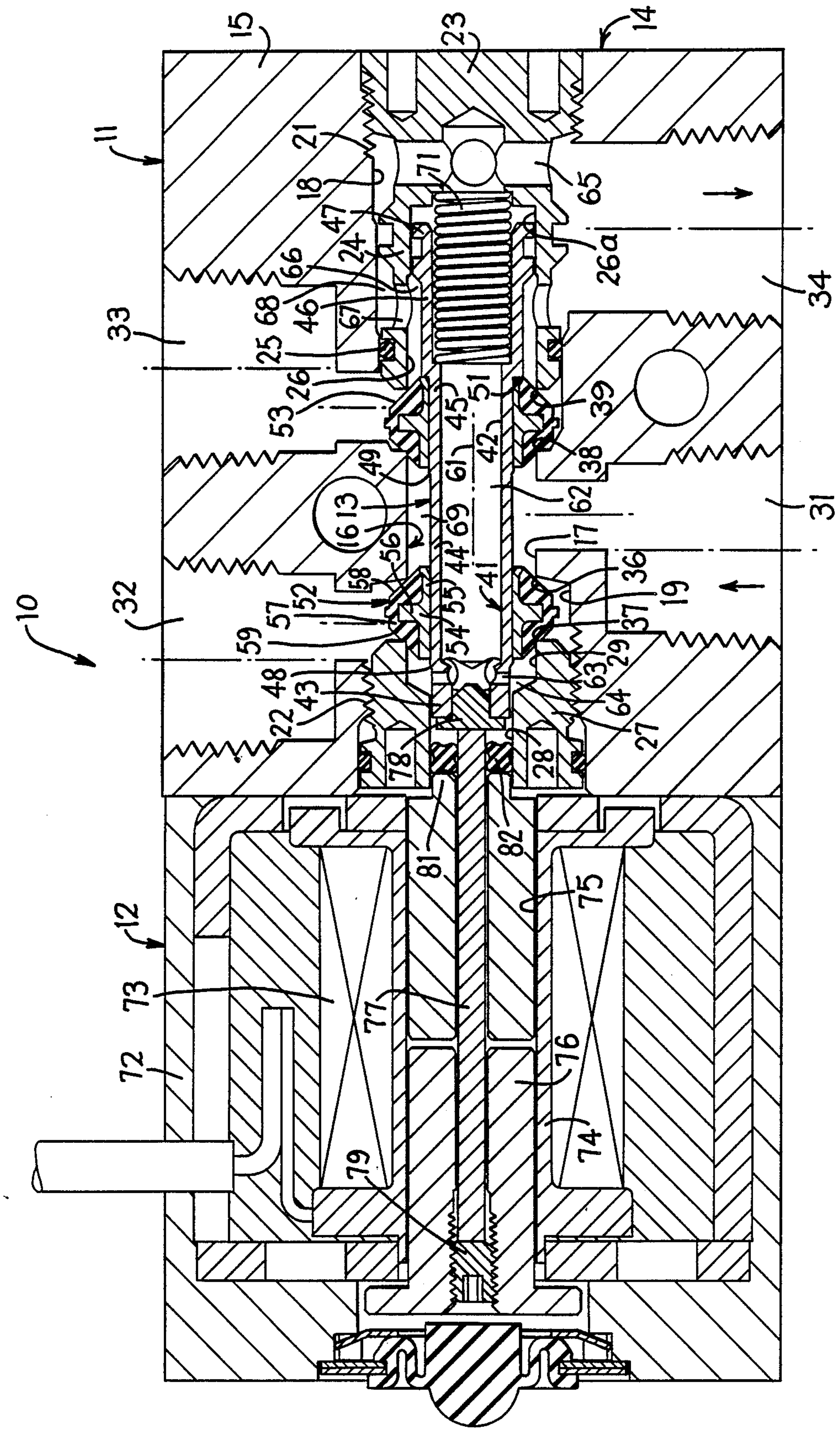
FIG. 1 is a central sectional view of the valve assembly according to the present invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the valve assembly and designated parts thereof. Said terminology will include the words specifically mentioned, derivatives thereof, and words of similar import.

DETAILED DESCRIPTION

FIG. 1 illustrates a valve unit 10 formed by a four-way valve assembly 11 connected to a solenoid operator 12. The valve assembly 11 includes a housing arrangement 14 having a single shiftable valve 13 coaxially slidably and sealingly disposed therein.

The housing arrangement 14 includes a monolithic one-piece integral valve body 15 having a bore 16 extending therethrough. This bore 16 includes a center bore portion 17 joined adjacent opposite ends thereof to enlarged-diameter end bore portions 18 and 19, the latter opening outwardly through the respective end faces of the valve body 15. The end bore portions 18 and 19 respectively have internal threads 21 and 22 extending partially throughout the length thereof.

Housing arrangement 14 also includes an end cap 23 which is threaded into the end bore portion 18 so as to sealingly close off the outer end of the bore 16. This end cap 23 has a sleeve part 24 which projects coaxially inwardly thereof into the bore portion 18 and this sleeve part 24, adjacent the inner free end thereof, mounts thereon an elastomeric seal ring 25 which sealingly engages the surrounding wall of the bore portion 18. This sleeve part 24 has a cylindrical bore 26 opening outwardly through the inner end thereof, which bore 26 is coaxially aligned with and of substantially the same inside diameter as the central bore 17.

A further cap 27 is associated with the housing arrangement 14 and is threadedly engaged within the other end bore portion 19. This cap 23 has a bore 28 extending coaxially therethrough, which bore opens inwardly from the outer end of the cap, and its inner end terminates in an enlarged bore portion 29 which projects to the inner end of the cap 27. This cylindrical bore 29 is coaxially aligned with and of substantially the same diameter as the central bore portion 17.

The valve body 15 defines therein four ports for communication with the bore 16, including an inlet or supply port 31 which extends traversely of body 15 for direct communication with the central bore portion 17, a first load port 32 which extends traversely of the body for communication with the enlarged end bore portion 19, a second load port 33 which extends traversely of the body for communication with the other enlarged end bore portion 18, and a single discharge or exhaust port 34. The supply port 31 is disposed so that the load ports 32 and 33 are positioned on opposite sides thereof as viewed in the axial direction of the bore 16. The exhaust port 34, on the other hand, communicates with the bore 16 solely adjacent one end thereof, namely adjacent the outer end of the end bore portion 18, whereby this exhaust port 34 is spaced axially outwardly relative to the adjacent load port 33.

A plurality of annular valve seats are defined on the housing arrangement, including a first annular valve seat 36 defined on valve body 15 at the intersection between the bore portions 17 and 19, and a further annular valve seat 37 defined on the axially inner end of the end cap 27. These valve seats 36 and 37 are each defined by a diameter which is equal to or slightly greater than the diameter of the central bore part 17. The valve seats 36 and 37 are disposed in opposed and axially-spaced relation so as to define therebetween an annular passage which provides communication between bore 16 and load port 32.

A further and similarly defined pair of axially opposed valve seats 38 and 39 are respectively defined on the body 15 and the end cap 23, and the annular gap defined between these opposed valve seats 38 and 39 provides communication between the bore 16 and the other load port 33. The pairs of opposed valve seats 36–37 and 38–39 are provided with equal axial spacing therebetween and are of the same diameter.

Considering now the shiftable valve 13, it includes a one-piece valve stem formed substantially by a hollow elongated cylindrical rod 41 having an opening or bore 42 extending generally coaxially therethrough. This rod 41 is of a generally externally stepped configuration throughout the axial length thereof and includes a first end portion 43 of minimal outside diameter, which portion 43 is axially slidably but non-sealingly supported within the cylindrical bore 28. This end rod portion 43 joins to a first intermediate rod portion 44 which is of slightly larger exterior diameter, and it in turn joins to a second intermediate rod portion 45 which is of still slightly larger exterior diameter. Portion 45 in turn joins to a third intermediate rod portion 46 of still greater exterior diameter, and this portion 46 in turn joins to an end rod portion 47 which is of greater exterior diameter and is axially slidably supported within the blind end portion 26*a* of bore 26, which bore portion 26*a* is of slightly smaller diameter than bore 26. The axial sliding engagement between end rod part 47 and bore 26 is, in this embodiment, a non-sealed relationship. A small step or shoulder 48 is formed exteriorly of the rod at the transition between the portions 43 and 44, and a similar small exterior shoulder or step 49 is formed at the transition between the rod portions 44 and 45. A further step or shoulder 51 is defined at the interface between the rod portions 45 and 46.

The valve 13 has a pair of poppets 52 and 53 stationarily mounted on the rod 41 in surrounding and axially spaced relationship thereto. The poppets 52 and 53 are disposed for cooperation between the opposed pairs of valve seats 36–37 and 38–39, respectively.

The poppet 52 includes a generally rigid support ring 54 which includes, as a primary part thereof, an axially elongated sleeve part 55 having an inner diameter which is slightly less than the outer diameter of the rod portion 44 so as to create a slight interference or press fit therebetween. The inner diameter of this sleeve part 55, however, is greater than the outer diameter of rod part 43 so as to enable the poppet to freely axially pass over the rod part 43. Support ring 54 also has an annular flange or rib 56 which is located generally centrally of the sleeve part 55 and projects radially outwardly therefrom, whereby the support ring 54 has a generally T-shaped profile when viewed in axial cross section.

Poppet 52 also has an integral one-piece poppet ring 57 of elastomeric or rubberlike material fixed on the support ring 54 in surrounding relationship thereto, such as by being molded thereon. This poppet ring 57 has an outer diameter significantly greater than the diameter of the center bore portion 17 so as to project radially outwardly through the annular gap defined between the opposed pair of valve seats 36–37. The poppet ring 57 defines thereon a pair of exterior and generally axially opposite facing seal faces 58 and 59, which seal faces 58 and 59 as illustrated by FIG. 1 extend approximately in perpendicular relation with one another. That is, the seal faces 58 and 59 individually slope radially outwardly at an angle of approximately 45° relative to the longitudinal axis 61 of the shiftable valve, whereby the poppet has a generally triangular configuration, with the apex of the triangular configuration projecting radially outwardly.

Each of the seal faces 58 and 59, as illustrated by FIG. 1, is defined on a mass of elastomeric material which, viewed in axial cross section, has a generally triangular profile so that engagement between the seal face 58, 59 and the respective valve seat 36, 37 results in contact at a location backed by a significant mass of elastomeric material. Further, the two triangular-shape masses of elastomeric material defining the seal faces 58 and 59, even though disposed on opposite sides of the support rib 56 so as to effectively function independent of one another, are nevertheless integrally molded and hence joined together by part of the poppet ring 57 molded around the radially outer end of the flange 56. This facilitates molding of the poppet and provides increased mold precision and poppet durability, particularly with respect to bonding or securement of the elastomeric poppet ring 57 to the support ring 54. The poppet ring 57 is preferably molded of an elastomer such as a nitrile rubber and preferably has a Shore A durometer in the range of about 60 to about 80.

The leading axial end (rightward end in FIG. 1) of the sleeve part 55 is preferably provided with a small taper or relief angle on the inner bore thereof to facilitate the slidable press fit of the poppet unto the rod section 44.

The other poppet ring 53 is identical to the poppet ring 52 except that the inner bore through the sleeve part has a diameter greater than that of the rod portion 44 but slightly smaller than the exterior diameter of the rod portion 45, whereby the sleeve part of the poppet 53 hence has an interference or press fit with the rod part 45 but can be freely axially telescoped over the rod 51 until reaching the shoulder 49. The axial end of the sleeve part associated with the poppet 53 is axially press fit unto the rod part 45 until it abuts the shoulder 51.

The rod 41 has a passage 62 extending axially therethrough, which passage 62 at one end thereof communicates through ports 63 formed radially through the wall of the tube for communication with an annular chamber 64 which surrounds the rod end portion 43. Chamber 64 is adapted for communication with the load port 32. The other end of passage 62 communicates with a passage 65 which extends transversely of the end cap 23 and directly communicates with the exhaust port 34.

A further annular chamber 66 is defined between the rod portion 46 and the sleeve part 24, and communicates via radial ports 67 with an annular chamber 68 which surrounds the sleeve part 24. This chamber 68 directly communicates with the exhaust port 34.

The inlet port 31 has direct communication with an annular chamber 69 formed in surrounding relationship to the rod 41 and disposed axially between the poppet 52 and 53. This chamber 69 is adapted for selected communication with one or the other of the load ports 32 and 33.

The valve 13 is normally maintained in the position illustrated by FIG. 1 by means of a spring 71. This spring has opposite ends thereof seated on opposed shoulders defined on the end cap 23 and the rod 41, thereby normally urging the valve 13 leftwardly into the illustrated position.

The valve 13 is shifted rightwardly, in opposition to the urging of spring 71, by means of the solenoid operator 12. The solenoid operator 12 is of generally conventional construction and includes a housing 72 which mounts therein a conventional solenoid winding 73, the latter surrounding an inner housing sleeve 74 which defines a bore 75 which is substantially aligned with the bore in the valve assembly. A solenoid plunger armature 76 is slidably supported within the bore 75, and additionally includes a plunger rod 77 slidably supported coaxially thereon so that one end of this rod projects outwardly for alignment with and abutting contact with an end plate 78 which is piloted to the end of the valve rod 41. The plunger rod 77 has the other end thereof adapted to abuttingly contact a stop 79 which is threadedly adjustably secured to the plunger armature 76. When the solenoid is energized, plunger sleeve 76 and rod 77 are moved axially inwardly (rightwardly in FIG. 1) to shift the valve 13 from a leftward-most end position into a rightward-most end position.

The solenoid housing is suitably fixedly secured relative to the valve body 15, and includes an annular guide part 81 which projects coaxially into the free end of the bore 28. To achieve a sealed relationship between the valve and solenoid assemblies, an elastomeric seal ring 82 is disposed within the bore 28 and creates a sealed relationship between the inner wall of bore 28 and the outer annular wall of plunger 77. This seal ring prevents pressurized air in the valve assembly from flowing into the interior of the solenoid operator. Further, the presence of pressurized air rightwardly of the elastomeric ring 82 also normally maintains this ring 82 in engagement with the exposed end of the guide part 81. The ring 82 is preferably constructed so as to have a generally X-shaped cross section defined by four uniform beads, namely a pair of axially spaced outer beads and a pair of axially spaced inner beads, such ring being conventionally known as a "quad" ring.

OPERATION

The operation of the embodiment illustrated by FIG. 1 will be briefly described.

When solenoid 12 is de-energized, the spring 71 maintains the shiftable valve 13 in the illustrated position wherein poppets 52 and 53 sealingly engage the respective valve seats 37 and 38. Hence, pressure fluid, namely air, supplied to port 31 then flows through annular passage 69 and thence into the load port 32. At the same time the other load port 33 is isolated from the inlet port 31, but rather communicates with the chamber 66 and thence through openings 67 for direct communication with the exhaust port 34.

When solenoid 12 is energized to cause rightward shifting of plunger 77, and a corresponding rightward shifting of valve 13, the poppets 52 and 53 shift rightwardly so as to respectively sealing engage the valve seats 36 and 39. Hence, load port 33 is now isolated from the exhaust, and instead is disposed in communication with the inlet port 31. At the same time the other load port 32 is isolated from the inlet port 31, and instead communicates with annular chamber 64 and thence through holes 63 with the passage 62 extending longitudinally of the valve rod, which in turn then communicates with passage 65 for direct communication with the exhaust port 34.

As is apparent from the above, both load ports 32 and 33 are capable of discharging directly into a single exhaust port 34, with one of the communication paths involving a passageway 62 extending axially through the valve rod 41. At the same time, the interior of the valve body is sealingly isolated from the interior of the solenoid by the presence of the elastomeric seal ring 82, which seal ring creates a sealed relationship between the valve housing and the solenoid plunger 77. This seal ring 82 constitutes the sole seal ring which creates a sealed relationship while permitting relative axial sliding between the cooperating parts, and this thus significantly minimizes the frictional "breakaway" force required to effect shifting of the valve. Since both load ports exhaust to the common exhaust port 34, no additional sealing rings are required for cooperation with the rightward end of the valve stem or for isolating the annular regions surrounding the sleeve part 24.

The structure of the shiftable valve is particularly desirable since the one poppet 53 can be initially slidably inserted over the valve rod 41 while using a press fit of the poppet onto the rod portion 45, with the poppet 53 being abutted against the shoulder 51. Thereafter the other poppet 52 is slidably inserted onto the rod until press fitted onto the rod portion 44. This latter poppet 52 can, during mounting thereof on the valve rod, be axially accurately positioned relative to the other poppet 53 so as to provide extremely high dimensional accuracy with respect to positioning of the two poppets with respect to one another. At the same time, each of the end caps 23 and 27 can be suitably axially threaded along the bore relative to the valve body 15 to provide further capability of adjusting the valve stem so as to achieve high positional accuracy of the shiftable valve relative to the valve body.

ALTERNATE EMBODIMENTS

Figure 2:
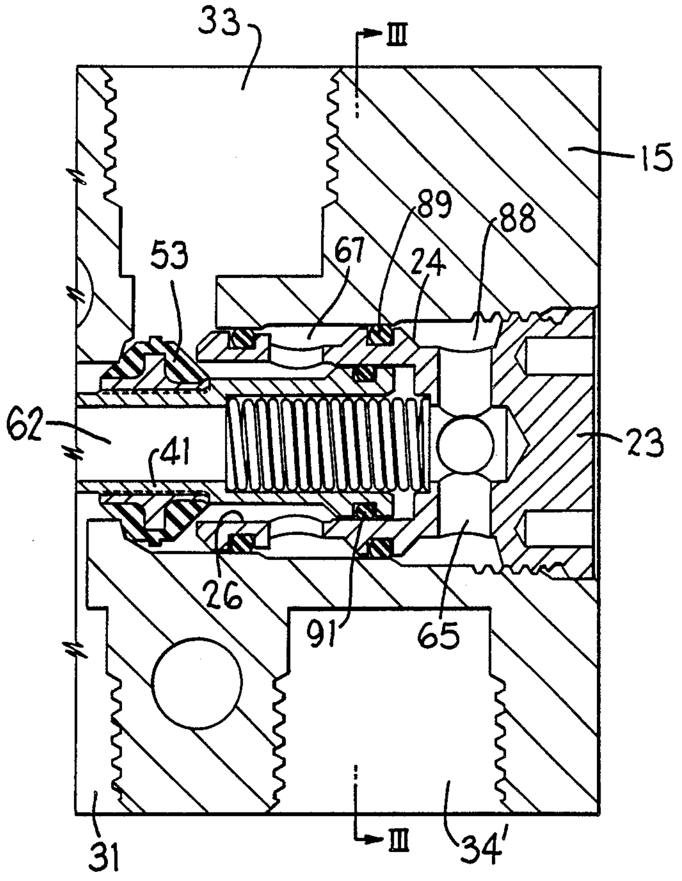
FIG. 2 is a fragmentary sectional view of the discharge end of the valve shown in FIG. 1, and showing a variation wherein the exhaust port has separate controls for permitting individual control of the exhaust from the separate load ports.
Figure 3:
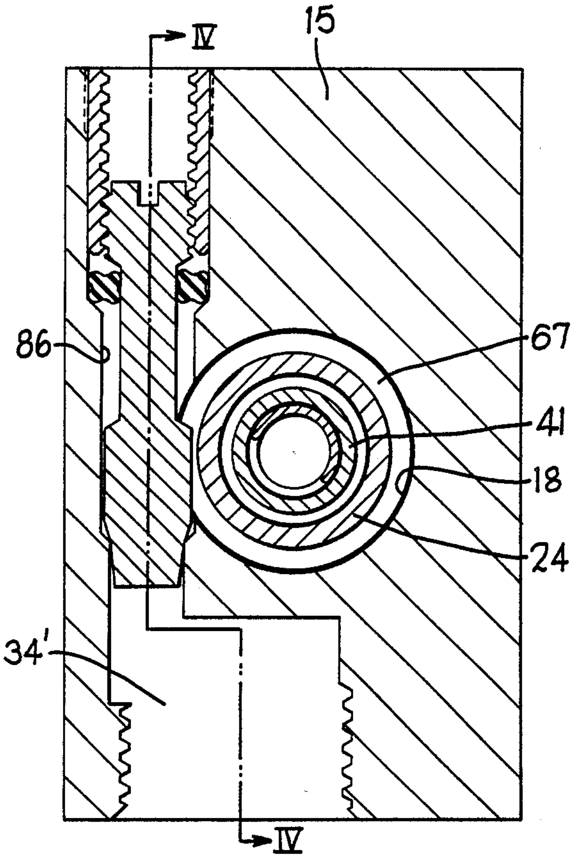
FIG. 3 is a sectional view taken substantially along line III—III in FIG. 2.
Figure 4:
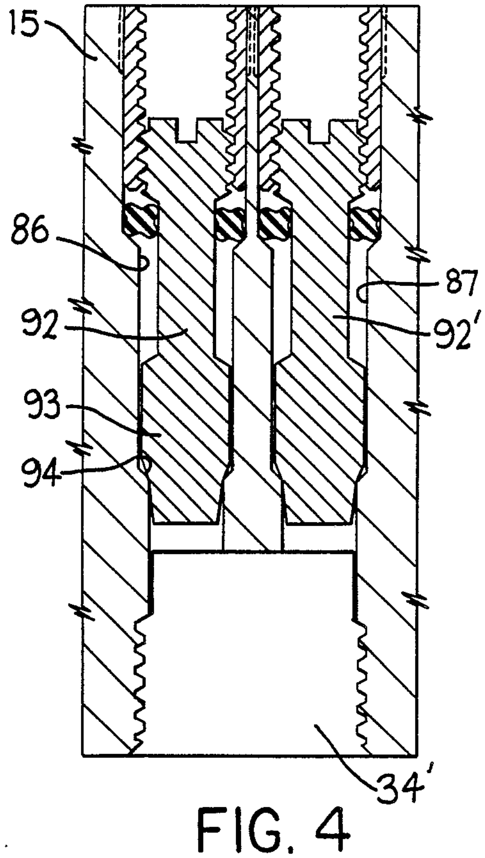
FIG. 4 is a fragmentary sectional view taken substantially along line IV—IV in FIG. 3.

FIGS. 2–4 illustrate a variation of the embodiment shown in FIG. 1. The variation of FIGS. 2–4 incorporates all of the structural and functional relationships possessed by FIG. 1 explained above except that this alternate embodiment is modified, particularly in relationship to the single exhaust port, so as to permit independent control over the exhaust flow rate from each of the load ports 32 and 33.

In this alternate embodiment, as illustrated by FIGS. 2–4, the single exhaust port 34′ does not directly communicate with the bore portion 18 but stops short thereof as illustrated by FIG. 2. The valve body 15 has a pair of bores 86 and 87 formed therein so as to tangentially intersect the end bore portion 18 in axially spaced relationship from one another, and each of these bores 86 and 87 continues on until intersecting the bottom of the exhaust port 34′ substantially as illustrated by FIGS. 3 and 4. The bore 86 tangentially intersects and communicates with the annular chamber 67, and the other bore 87 tangentially intersects and communicates with an annular chamber 88, the latter being disposed in surrounding relationship to the sleeve part 24 and in communication with the passage 65 extending radially thereof. The sleeve part 24 in addition has an annular elastomeric seal ring 89, such as an O-ring, confined therearound and disposed in sealing engagement with the interior wall of the bore portion 18. This seal ring 89 effectively sealingly isolates the annular chambers 67 and 88 from one another.

A further elastomeric seal ring 91, namely an O-ring, is confined exteriorly around the rightward end of the rod 41 and is maintained in slidable sealing engagement with the surrounding wall of the bore 26.

The bore 86 has a flow control element 92 axially threadably and sealingly engaged therein, which control element has a conical nose part 93 which cooperates with an annular shoulder 94 formed on the valve body at a location between the bore portion 18 and the exhaust port 34′. By suitably axially adjusting the member 92, the annular opening between conical part 93 and shoulder 94 can be either fully closed or gradually opened so as to hence adjust the rate of exhaust of air from the chamber 67 through the exhaust passageway defined by bore 86 into the exhaust port 34′.

The other control bore or port 87 has a flow control member 92′ therein which structurally and functionally cooperates in the same manner as the member 92 so as to permit individual control over the discharge from annular chamber 88 through the exhaust passageway defined by bore 87 into the discharge port 34′.

This valve unit of FIGS. 2–4 hence works in the same manner as the valve unit of FIG. 1 except that the discharge from each of the load ports 32 and 33 can be individually controlled. That is, by suitably adjusting the control 92, the discharge from port 33 through chamber 67 and thence into the port 34′ can be individually controlled and adjusted. Similarly, by suitable adjustment of the other control member 92′, the discharge from port 32 through the passages 62 and 65 into the annular chamber 88 can then be suitably and adjustably controlled as the exhaust flows past the control member 92′ into the exhaust port 34′.

With this desirable arrangement, an extremely compact four-way valve is provided employing solely four ports for controlling flow, and the single exhaust port can additionally be provided with dual adjustable flow controls so as to permit independent control and adjustment of the exhaust from each of two different load ports. This ability to provide separate control over the exhaust from the two load ports is still achieved using only two slidable seal rings, namely the seal ring 82 (FIG. 1) and the seal ring 91 (FIG. 2).

Figure 5:
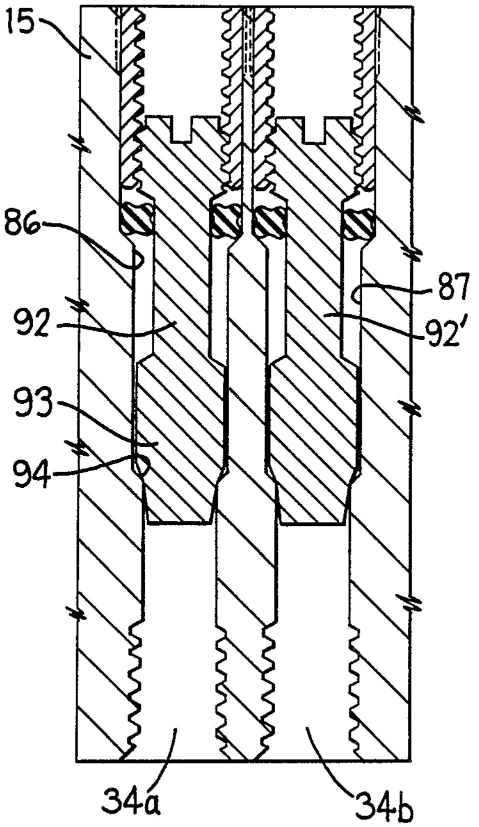
FIG. 5 is a fragmentary sectional view similar to FIG. 4 but illustrating a variation of the invention.

Referring now to FIG. 5, there is illustrated a further variation of the invention. The variation of FIG. 5 substantially correspond to the variation shown by FIG. 4 except that the separate exhaust passageways or bores 86 and 87 do not communicate with a single exhaust port, but rather remain separated from one another and continue through the valve body so as to define separate exhaust ports 34*a* and 34*b* which are disposed adjacent one another. Both of these exhaust ports 34*a* and 34*b* are hence positioned in adjacent relationship to one another, and are formed solely adjacent one end of the valve body for communication solely with the valve bore adjacent one axial end thereof. Hence, if the overall valve assembly is intended for cooperation with a manifold, the manifold itself can be extremely small and compact since the exhaust ports 34a and 34b are disposed closely adjacent and solely at one end of the valve body, thereby greatly minimizing the structural size, complexity and space requirements of the manifold, and of the overall assembly.

While the FIG. 5 embodiment illustrates each of the discharge ports having a separate adjustable flow control associated therewith, it will be recognized that the valve can be utilized without the flow controls associated therewith, in which case the ports 34a and 34b and the respective bores or passageways 86 and 87 would communicate solely with the valve bore, and the other ends (upper ends in FIG. 5) of bores 86 and 87 would be either not drilled through or appropriately sealingly plugged.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A solenoid-operated, single-stem, four-way valve assembly, comprising:

housing means including a one-piece monolithic valve body having cylindrical bore means formed therein and extending therethrough, said cylindrical bore means including a center bore portion coaxially aligned with and extending between first and second end bore portions, said center bore portion being of smaller diameter than said end bore portions;

said housing means including a first end cap sealingly and stationarily seated within said first end bore portion and having cylindrical opening means extending therethrough in coaxial communication with said cylindrical bore means;

said housing means including a second end cap stationarily disposed within and closing said second end bore portion, said second end cap having a sleeve part which projects coaxially inwardly into said second end bore portion and defines therein a cylindrical guide bore which coaxially communicates with said cylindrical bore means;

a supply port formed in said valve body and communicating with said bore means substantially adjacent a midpoint thereof;

first and second load ports formed in said valve body and communicating with said bore means on axially opposite sides of said supply port;

a single exhaust port formed in said valve body and communicating with said second end bore portion at a location spaced axially outwardly from said second load port so that said second load port is positioned axially between said supply port and said exhaust port;

a single elongated and axially shiftable valve positioned within said cylindrical bore means for controlling flow of fluid between said ports, said valve including an elongated rodlike stem disposed within and extending substantially coaxially through said center bore portion, said stem having opposite first and second end portions which are axially slidably supported respectively within said cylindrical opening means and said guide bore;

said housing means including a first pair of annular valve seats disposed in axially opposed and axially spaced relationship to one another and in concentric relationship to said bore means, said first load port communicating with said bore means between said first pair of valve seats, one of said valve seats being defined on said valve body substantially at the end of said center bore portion, and the other of said valve seats being defined on said first end cap;

said housing means including a second pair of annular valve seats disposed in axially opposed and axially spaced relationship to one another and in concentric relationship to said bore means, said second load port communicating with said bore means between said second pair of valve seats, one of said valve seats being defined on said valve body substantially at the end of said center bore portion, and the other of said valve seats being defined on said second end cap;

said valve including first and second annular poppet-type valve members fixedly mounted on said stem in encircling relationship therewith and in axially spaced relationship therealong, said first poppet-type valve member projecting radially outwardly into the annular space between said first pair of valve seats and being axially movable therebetween for alternate sealing engagement therewith, and said second poppet-type valve member projecting radially outwardly into the annular space between said second pair of valve seats and being axial movable therebetween for alternate sealing engagement therewith;

a first exhaust passageway for permitting communication between said first load port and said exhaust port when said valve is in a first end position wherein said first and second valve members are sealingly engaged with respective said one valve seats, said first exhaust passageway including a main exhaust passage extending coaxially through said stem and communicating at one end thereof with said cylindrical opening means at a location spaced axially outwardly from said other valve seat as formed on said first end cap, said main exhaust passage at its other end communicating with an intermediate passage formed in said second end cap with said intermediate passage in turn communicating with said exhaust port;

a second exhaust passage for providing communication between said second load port and said exhaust port when said valve is in a second end position wherein said first and second valve members are sealingly engaged with respective said other valve seats, said second exhaust passageway including an annular exhaust chamber formed between said second end portion of said stem and said sleeve part coaxially outwardly from said one valve seat as defined on said second end cap, said annular exhaust chamber being in continuous communication with said exhaust port; and electric solenoid means for effecting axial shifting of said valve between said first and second end positions, said solenoid means including a plunger-type actuator projecting coaxially into engagement with one end of said valve.

2. A valve assembly according to claim 1, wherein said stem is directly axially slidably supported solely by the end portions of said stem being slidably supported on said first and second end caps, the areas of slidable engagement between said stem and said first and second end caps being free of elastomeric seal rings, and a single elastomeric seal ring being disposed in surrounding relationship to said actuator for creating a sealed engagement between said actuator and said first end cap, said elastomeric ring being the sole elastomeric sliding seal.

3. A valve assembly according to claim 2, wherein each said valve member includes a support ring having an elastomeric poppet ring molded therearound, said support ring including an axially-elongate sleeve part having a press fit engagement in surrounding relationship to the stem, said support ring also having an annular flange which is fixed to the sleeve part at a location intermediate the axial ends thereof and which projects radially outwardly therefrom, and said elastomeric poppet ring comprising an integral annular one-piece ring which externally surrounds said flange and said sleeve part and which includes enlarged elastomeric portions disposed on axially opposite sides of the annular flange, said elastomeric portions defining thereon exterior seal faces adapted to sealingly contact a respective said valve seat, the seal faces defined on the pair of elastomeric portions associated with said elastomeric poppet ring extending transversely with respect to one another.

4. A valve assembly according to claim 3, wherein said first valve member is press fit onto a first cylindrical portion of said stem having a first exterior diameter, said second valve member is press fit onto a second cylindrical portion of said stem having a second exterior diameter which is slightly greater than said first diameter, said second valve member being disposed with one end thereof abutted against a shoulder defined on said stem, said first valve member being axially positionable along said first portion of said stem free of axial shoulders.

5. A valve assembly according to claim 4, wherein each of said first and second end caps is threadedly engaged within the respective first and second end bore portions.

6. A valve assembly according to claim 1, wherein said first and second exhaust passageways respectively include first and second independent control means for individually and independently controlling the exhaust of pressure fluid from said first and second load ports into said exhaust port, said first and second control means being mounted on said valve body for directly controlling discharge of pressure fluid into said exhaust port.

7. A valve assembly according to claim 6, wherein said first control means includes a first control passage formed in said valve body for providing communication between said exhaust port and said intermediate passage, a first control member being adjustably positionable within said first control passage for regulating flow therethrough, said second control means including a second control passage formed in said valve body for providing flow from said annular exhaust chamber to said exhaust port, and a second control member movably positioned within said second control passage for regulating flow therethrough.

8. A valve assembly according to claim 7, wherein said first and second control passages are formed in said valve body in generally parallel relationship and substantially transversely intersect said second end bore portion in axially spaced relationship therealong.

9. A poppet-type single-stem four-way valve assembly, comprising:

housing means defining therein a cylindrical bore means which opens outwardly through at least one end face thereof;

a supply port formed in said housing means and disposed in continuous communication with a central part of said bore means;

a first load port formed in said housing means in communication with said bore means at a location disposed axially on one side of said supply port, said housing means at the point of communication between said first load port and said bore means defining thereon a first pair of axially opposed and axially spaced annular valve seats;

a second load port formed in said housing means in communication with said bore means at a location spaced axially from said supply port on the axially opposite side from said first load port, said housing means at the point of communication of said second load port with said bore means having thereon a second pair of axially spaced and axially opposed annular valve seats;

said housing means having only a single exhaust port formed therein and communicating with said bore means solely adjacent one axial end thereof at a location spaced axially outwardly from an adjacent said load port;

a single elongated and axially shiftable valve unit slidably supported within said bore means for controlling flow of fluid between said ports, said valve unit including a single axially-elongated rodlike stem disposed within and extending substantially coaxially along said bore means, and first and second annular poppet valves stationarily encircling said stem in axially spaced relationship thereon, said first and second poppet valves being disposed so as to project radially outwardly between and being axially movable for alternate sealing engagement with the individual valve seats of the respective first and second pairs;

said stem including first and second axially-adjacent cylindrical portions which are of first and second diameters, said second diameter being slightly greater than said first diameter, said second cylindrical portion adjacent one end thereof terminating in a radially outwardly projecting shoulder, said second poppet valve being mounted on said second cylindrical portion with a press fit therebetween and disposed so as to abut against said shoulder, and said first poppet valve being mounted on said first cylindrical portion with a press fit therebetween, said first poppet valve being free of abutting contact with axial restrictions on said stem so as to be axially positionably adjusted relative to said second poppet valve.

10. A valve assembly according to claim 9, wherein each said poppet valve has an axially elongate rigid sleeve part which is press fit over the respective cylindrical portion and has a radially-outwardly extending flange part rigid with said sleeve part, each said poppet valve also having a single one-piece molded elastomeric poppet ring molded so as to entirely externally surround said flange and the outer peripheral wall of said sleeve part, said poppet ring defining enlarged elastomeric portions disposed on axially opposite sides of said flange for defining axially oppositely facing elastomeric valve faces adapted for engagement with respective valve seats.

11. A valve assembly according to claim 10, wherein said exhaust port is disposed more closely adjacent but spaced axially outwardly from said second load port, and an exhaust passageway for providing communication from said first load port to said exhaust port, said exhaust passageway including an elongate exhaust passage extending axially throughout a substantial portion of the axial length of said stem.

12. A valve assembly according to claim 9, wherein said second diameter exceeds said first diameter by an amount in the range of about 0.003 inch to about 0.010 inch.

13. A valve assembly according to claim 9, including an electric solenoid operator for effecting shifting of said valve unit, said operator including a plunger supported for linear reciprocating movement and projecting coaxially inwardly into the open end of said bore means for abutting contact with an adjacent end of said stem.

14. A valve assembly according to claim 9, wherein said housing means includes therein first and second separate exhaust passageways which at one end separately communicate with said bore means adjacent said one axial end thereof, said first and second exhaust passageways at the other end thereof communicating with said exhaust port.

15. A poppet-type single-stem four-way valve assembly, comprising:

housing means defining therein a cylindrical bore means which opens outwardly through at least one end face thereof;

a supply port formed in said housing means and disposed in continuous communication with a central part of said bore means;

a first load port formed in said housing means in communication with said bore means at a location disposed axially on one side of said supply port, said housing means at the point of communication between said first load port and said bore means defining thereon a first pair of axially opposed and axially spaced annular valve seats;

a second load port formed in said housing means in communication with said bore means at a location spaced axially from said supply port on the axially opposite side from said first load port, said housing means at the point of communication of said second load port with said bore means having thereon a second pair of axially spaced and axially opposed annular valve seats;

exhaust port means formed in said housing means solely adjacent one axial end of said bore means and communicating with said bore means solely adjacent said axial end thereof at a location spaced axially outwardly from an adjacent said load port, said exhaust port means including separate first and second exhaust passageways which at one end separately communicate with said bore means adjacent said one axial end thereof;

a single elongated and axially shiftable valve unit slidably supported within said bore means for controlling flow of fluid between said ports, said valve unit including a single axially-elongated rodlike stem disposed within and extending substantially coaxially along said bore means, and first and second annular poppet valves stationarily encircling said stem in axially spaced relationship thereon, said first and second poppet valves being disposed so as to project radially outwardly between and being axially movable for alternate sealing engagement with the individual valve seats of the respective first and second pairs;

said stem including first and second axially-adjacent cylindrical portions which are of first and second diameters, said second diameter being slightly greater than said first diameter, said second cylindrical portion adjacent one end thereof terminating in a radially outwardly projecting shoulder, said second poppet valve being mounted on said second cylindrical portion with a press fit therebetween and disposed so as to abut against said shoulder, and said first poppet valve being mounted on said first cylindrical portion with a press fit therebetween, said first poppet valve being free of abutting contact with axial restrictions on said stem so as to be axially positionably adjusted relative to said second poppet valve.

16. In a poppet-type valve assembly having a housing provided with a bore therein, a valve stem slidably supported within said bore, a plurality of ports formed in said housing and communicating with said bore at axially spaced locations, at least one of said ports communicating with said bore through an annular gap defined between a pair of axially spaced annular valve seats which are defined on said valve housing and concentrically encircle said bore, and said valve stem having a poppet-type valve member stationarily mounted thereon in encircling relationship thereto, said poppet-type valve member projecting radially outwardly into said annular gap and being alternately sealingly engagable with one or the other of said valve seats in response to axial shifting of said valve stem, the improvement wherein said poppet-type valve member comprises an axially elongate rigid sleeve part which is slidably press fit over the valve stem and has a radially-outwardly extending annular flange part rigid with said sleeve part and located axially substantially at the middle thereof, and a single one-piece molded elastomeric poppet ring molded so as to entirely externally surround said flange and the outer peripheral wall of said sleeve part, said poppet ring defining enlarged elastomeric portions disposed on axially opposite sides of said flange for defining axially oppositely facing elastomeric seal faces adapted for sealing engagement with respective valve seats, said flange having an axial thickness and including oppositely facing axial surfaces which are axially spaced from one another by said flange thickness and which adjoin said outer peripheral wall of said sleeve part, said poppet ring including an axially central portion which axially joins said enlarged portions adjacent their radially outer ends and which radially surrounds said flange, each of said enlarged portions axially covering one of said flange surfaces and radially surrounding the adjoining outer peripheral wall of said sleeve part, said enlarged portions extending axially away from said flange surfaces and terminating in said axially facing seal faces, each said enlarged portion having a nonuniform axial thickness as defined between said seal face thereof and the associated flange surface, each said enlarged portion having a first axial thickness at a radially inner end thereof adjacent said sleeve part, and a second axial thickness at said radially outer end thereof adjacent said central portion, said nonuniform axial thickness increasing gradually as said enlarged portions extend from said radially outer ends thereof to said radially inner ends, said seal faces inclining away from said flange surfaces as they extend from said radially outer ends of said enlarged portions to said radially inner ends thereof, said first axial thickness of said enlarged portions being substantially greater than said second axial thickness and also being substantially greater than said flange axial thickness, and said annular valve seats radially overlapping said flange and said seal faces by a substantial amount.

17. A valve assembly according to claim 16, wherein the seal faces as defined on axially opposite sides of the valve member extend in transverse relationship to one another.

18. A valve assembly according to claim 17, where the seal faces on opposite axial sides of the poppet ring, in axial cross section, extend approximately in perpendicular relationship to one another.

19. A valve assembly according to claim 16, wherein said first axial thickness of said enlarged portions is substantially greater than a radial thickness of said central portion.

20. In a poppet-type valve assembly having a housing provided with a bore therein, a valve stem slidably supported within said bore, a plurality of ports formed in said housing and communicating with said bore at axially spaced locations, at least one of said ports communicating with said bore through an annular gap defined between a pair of axially spaced annular valve seats which are defined on said valve housing and concentrically encircle said bore, and said valve stem having a poppet-type valve member stationarily mounted thereon in encircling relationship thereto, said poppet-type valve member projecting radially outwardly into said annular gap and being alternately sealingly engagable with one or the other of said valve seats in response to axial shifting of said valve stem, the improvement wherein said poppet-type valve comprises:

an axially elongate rigid sleeve part which is slidably press fit over the valve stem, and a radially-outwardly extending rigid annular flange part which encircles the sleeve part and is rigid therewith, said flange part being located axially substantially at the middle of said sleeve part, said flange part having an axial thickness which is a small fraction of the overall axial length of the sleeve part, whereby the sleeve part has end sleeve portions which project axially in opposite axial directions from said flange part;

a single one-piece molded elastomeric poppet ring molded so as to entirely externally surround said flange and the outer peripheral wall of said end sleeve portions of said sleeve part;

said elastomeric poppet ring including enlarged elastomeric portions which are disposed on axially opposite sides of said flange part and respectively encircle the end sleeve portions of said sleeve part, and an axially central portion which externally surrounds said flange part and axially adjoins said enlarged portions adjacent radially outer ends thereof;

each said enlarged elastomeric portion extending axially between one axial side of said flange part and an adjacent axial free end of said sleeve part, said enlarged elastomeric portion being of small radial thickness in the vicinity of the axial free end of the sleeve part, said enlarged elastomeric portion adjacent said flange part having a radial thickness greater than the radial extent of said flange part so as to project outwardly for connection with said axially central portion; and each said enlarged elastomeric portion having an outer peripheral surface which is of a maximum diameter adjacent said flange part and which is of generally decreasing diameter as said enlarged portion projects axially to the respective free end of the sleeve part so that the outer peripheral surface approximates a frusto-conical surface, said outer peripheral surface being disposed for engagement with one of the valve seats.

21. A valve assembly according to claim 20, wherein said flange is of generally uniform axial thickness throughout the radial extent thereof, and the axial thickness of said flange is a small fraction of the maximum axial thickness of the enlarged elastomeric portion.

* * * * *